United States Patent [19]

Yao et al.

[11] 4,087,560
[45] May 2, 1978

[54] KETCHUP SUBSTITUTE AND PROCESS FOR MAKING THE SAME

[75] Inventors: Alden K. Yao; James L. Segmiller, both of Pittsburgh, Pa.

[73] Assignee: H. J. Heinz Company, Pittsburgh, Pa.

[21] Appl. No.: 748,314

[22] Filed: Dec. 7, 1976

Related U.S. Application Data

[63] Continuation-in-part of Ser. No. 573,007, Apr. 30, 1975, abandoned.

[51] Int. Cl.² ............................................... A23L 1/24
[52] U.S. Cl. .................................... 426/250; 426/589; 426/638; 426/639; 426/650
[58] Field of Search .............. 426/250, 589, 615, 638, 426/639, 650

[56] References Cited

U.S. PATENT DOCUMENTS

| | | | |
|---|---|---|---|
| 2,145,108 | 1/1939 | Cooper | 426/650 |
| 2,331,308 | 10/1943 | Cooper | 426/589 |
| 3,116,151 | 12/1963 | Giddy | 426/589 |
| 3,399,064 | 8/1968 | Partyka | 426/589 |
| 3,549,384 | 12/1970 | Walker | 426/615 |
| 3,630,757 | 12/1971 | Meid | 426/615 |

*Primary Examiner*—Jeanette M. Hunter
*Attorney, Agent, or Firm*—Paul & Paul

[57] ABSTRACT

A ketchup substitute prepared by mixing a starch slurry with a cooked seasoned carrot batch, and subsequently heating, pulping and deaerating the mixture.

2 Claims, No Drawings

KETCHUP SUBSTITUTE AND PROCESS FOR MAKING THE SAME

This is a continuation-in-part application of our pending application Ser. No. 573,007 filed Apr. 30, 1975 now abandoned.

BACKGROUND OF THE INVENTION

The present invention relates to the field of edible food products and, more specifically, pertains to a condiment product useful as a substitute for ketchup.

Ketchup is a well known and widely used condiment which is comprised of a basic tomato paste of a thick, yet flowable, consistency wherein various spices and seasoning agents are incorporated to provide the desired flavor. While tomato paste comprises a major portion of the product, both on a weight and volume basis, its contribution to the taste thereof is limited to the tomato flavor that it provides. The spices and seasonings which are added to the tomato paste in preparing ketchup are the primary contributors to the distinctive flavor associated with the condiment and provide it with its unique identity as ketchup.

However, tomato paste is the most critical ingredient of ketchup and, in fact, its presence is required in order to label the product as such. The most significant function of the tomato paste is to provide the basic consistency and degree of flowability which is generally associated with ketchup. In fact, the degree of the flow associated with ketchup is considered by those in the art to be very important in the eye of the consumer and, accordingly, it is a critical factor requiring control in the manufacturing process therefor.

Various attempts have been made in the prior art to simulate a ketchup product by providing a substitute for a portion of the tomato paste, either partially or in toto. U.S. Pat. No. 3,788,862 (Hoover et al.) provides a partially simulated product, wherein various forms of filler, such as starch, corn meal, soy product or animal protein, have been substituted for a large portion of the tomato solids. In U.S. Pat. No. 3,630,757 (Meid) a simulated tomato product is provided containing substantially no tomato solids, but having substituted therefor a bodying agent, preferably mustard seed hulls, together with a gum or starch material. However, none of the products known in the prior art provide the novel and unique advantages of the ketchup substitute of the present invention.

SUMMARY OF THE INVENTION

In accordance with the present invention, it has been discovered that a unique condiment, useful as a ketchup substitute, can be prepared by substituting finely divided carrots, ranging in size from 5 - 400 microns for up to 75% by weight of the tomato solids in ketchup. A process for preparing the novel ketchup substitute of the present invention is provided and comprises substituting diced, cooked carrots for a substantial portion of the tomato paste normally required in preparing pure tomato ketchup and then pulping the ketchup substitute product so that the partical size of the carrot is between 5 - 400 microns.

Accordingly, it is the primary object of this invention to provide an edible food product which may be used as a ketchup substitute and which, both in taste and appearance, is nearly identical to ketchup, but which contains a substitute for a major portion of the tomato paste which ketchup would otherwise contain.

It is further an object of this invention to provide a ketchup-like product for use as a condiment which is virtually indistinguishable, both in appearance and taste, from "pure" tomato ketchup.

It is a further object of the present invention to provide a novel and useful process for preparing the products of the foregoing objects.

It is yet a further object of the present invention to provide a ketchup substitute which, while being virtually indistinguishable from pure tomato ketchup in its use as a condiment, substitutes finely divided carrots for a substantial portion of the tomato paste and thus not only provides a suitable substitute for tomato paste, but which further contributes useful vitamins, minerals and other nutritious ingredients to said product.

DESCRIPTION OF THE PREFERRED EMBODIMENT

In accordance with the preferred embodiment of the present invention, an edible food product is provided which is virtually indistinguishable from tomato ketchup, not only in taste, but also in the other physical attributes commonly associated therewith, including but not limited to body, consistency, color, and most significantly, the degree of flow. Accordingly, a process for preparation of the same is also set forth in detail.

A preferred ketchup substitute in accordance with the present invention would contain, on a weight basis, 5 - 25% tomato paste, 10 - 50% finely divided carrots ranging in particle size between 5 - 400 microns, 90% of said carrots having a particle size between 10 - 130 microns, 5 - 25% water, 10 - 30% sweeteners, 2 - 5% salt, 8 - 18% seasoning agents, $\frac{1}{2}$ - 2% thickeners, 0.01 to 0.5% artificial colorings, and 10 - 25% vinegar.

A typical process for preparation of the ketchup substitute of the present invention begins with preliminary preparation of a starch slurry and cooking and subdividing carrots. Thereafter, carrots, salt, seasoning agents, vinegar, sweeteners, artificial colorings, and tomato paste with sufficient water are mixed and brought to 160° F.

The mixture is then pulped by conventional means so as to adjust the particle size of the carrots to the necessary fine texture. It should be noted that the manner in which the mixture is pulped is immaterial provided it is effective to produce the required fine carrot pulp.

Starch is then added to the mixture with agitation, after which the temperature of the same is adjusted to about 200° - 210° F. Finally, the mixture is deaerated by conventional means and may be filled into suitable containers for marketing.

As will be readily apparent to one skilled in the art, the various seasoning agents which contribute significantly to the unique flavor of the ketchup substitute product of the present invention may be varied greatly, both in the selection of specific types to be used and in the amounts thereof, as may be required to produce the desired flavor. Accordingly, it is fully within the purview of the present invention that various modifications and substitution of ingredients and exact proportions thereof can be made by those skilled in the art, all within the purview of the invention and the scope of the appended claims.

The following example is provided to set forth in detail the preferred ketchup substitute product of the present invention and the process by which the same is prepared.

EXAMPLE 1

In accordance with the present invention, a preferred ketchup substitute product was prepared in the following manner:

First, the various pre-batch operations were conducted. A starch slurry was prepared by mixing 10 ozs. of starch in 3 lbs. of water. A pre-batch of carrots was prepared by boiling 25 lbs. of peeled, chopped or diced carrots for 20 minutes. Then the following ingredients were mixed in a kettle with agitation: 18 lbs. of tomato paste, 12 lbs. of vinegar, 16 lbs. of sugar, 5 lbs. of corn syrup, 3 lbs. of salt, 10 ozs. of onion powder, 1 oz. of garlic powder, the pre-batch cooked carrots, and 3 gm. of Red #40. The mixture was gauged to 10 gal. and was heated to 160° F.

The mixture was then milled by a hammer mill, such as a Fitzpatrick, Rietz pulverizer equipped with a screen of 0.033 in. openings and a back-up screen of 1/4 in. openings, followed by a finisher equipped with a 0.032 in. screen. Ninety percent of the milled carrot solids have a particle size between 10 and 130 microns. The starch slurry was then added with agitation, and the temperature of the mixture then adjusted to 205° F. Finally, the mixture was deaerated and filled into a suitable container. The product thus produced has substantially the characteristics of tomato ketchup including the following:

(1) Typical ketchup taste free from scorching or any objectionable flavor.

(2) A consistency measured by a Bostwick consistometer that is no more than 9 centimeters in 30 seconds at 77° F.

(3) A color grade equal or better than Grade B color recommended by the U.S. Department of Agriculture for grading tomato ketchup color.

What is claimed is:

1. A process for the preparation of an edible food product having substantially the characteristics of tomato ketchup and free from any objectionable flavor consisting essentially of:
   (a) preparing a starch slurry by mixing starch in water in about the proportions of 10 ounces of starch to about 3 pounds of water;
   (b) preparing a pre-batch of carrots by first peeling, chopping and dicing 10 to 50 pounds of raw carrots and then boiling said carrots in water;
   (c) combining the boiled carrots thus obtained with 2 – 5% by weight salt, 8 – 18% by weight seasoning agents, 5 – 25% by weight vinegar, 10 – 30% by weight sweeteners, 0.1 – 0.5% by weight artificial colorings, 5 – 25% by weight tomato paste and sufficient water to bring to a volume of 10 gallons;
   (d) agitating the mixture thus obtained;
   (e) heating said mixture to about 160° F;
   (f) pulping said mixture by hammer mill followed by a finisher so as to adjust the particle size of the carrots to within the range of from about 5 to about 400 microns, 90 percent of the carrot solids having a particle size between about 10 and 130 microns;
   (g) adding said starch slurry to said mixture in about the proportions of 3 pounds starch slurry to about 10 gallons of said mixture with agitation;
   (h) adjusting the temperature of said mixture to about 180° – 210° F; and
   (i) deaerating said mixture, whereby said edible product is produced.

2. The product produced by the process of claim 1.

* * * * *